(12) United States Patent
Schumacher

(10) Patent No.: US 11,064,650 B2
(45) Date of Patent: Jul. 20, 2021

(54) SOWING UNIT FOR A SOWING MACHINE

(71) Applicant: Kverneland AS, Klepp Stasjon (NO)

(72) Inventor: Ferdinand Schumacher, Lippetal-Oestinghausen (DE)

(73) Assignee: Kverneland AS, Klepp Stasjon (NO)

( * ) Notice: Subject to any disclaimer, the term of this patent is extended or adjusted under 35 U.S.C. 154(b) by 264 days.

(21) Appl. No.: 15/808,520

(22) Filed: Nov. 9, 2017

(65) Prior Publication Data
US 2018/0124999 A1 May 10, 2018

(30) Foreign Application Priority Data

Nov. 10, 2016 (EP) .................................. 16198220

(51) Int. Cl.
*A01C 7/20* (2006.01)
*A01C 7/10* (2006.01)

(52) U.S. Cl.
CPC .............. *A01C 7/201* (2013.01); *A01C 7/102* (2013.01)

(58) Field of Classification Search
CPC ........... A01C 7/20; A01C 7/201; A01C 7/208; A01C 7/046
See application file for complete search history.

(56) References Cited

U.S. PATENT DOCUMENTS

| 2003/0183141 | A1 | 10/2003 | Bergere et al. | |
| 2010/0192819 | A1* | 8/2010 | Garner | A01C 7/20 111/11 |
| 2014/0026793 | A1* | 1/2014 | Baker | A01C 15/006 111/185 |
| 2015/0351313 | A1 | 12/2015 | Dienst | |
| 2016/0143214 | A1* | 5/2016 | Kremmer | A01C 7/208 111/170 |
| 2016/0212932 | A1* | 7/2016 | Radtke | A01C 7/046 |
| 2016/0255770 | A1* | 9/2016 | Levy | A01C 23/023 |
| 2017/0034995 | A1* | 2/2017 | Wilhelmi | A01C 5/062 |

(Continued)

FOREIGN PATENT DOCUMENTS

| DE | 19613785 C2 | 8/2002 |
| DE | 102008056526 B3 | 5/2010 |

(Continued)

OTHER PUBLICATIONS

European patent Office Search Report dated Apr. 4, 2017 in reference to European Patent Application No. 16198220.2 filed Nov. 10, 2016.

*Primary Examiner* — Alicia Torres
(74) *Attorney, Agent, or Firm* — Dinsmore & Shohl, LLP

(57) ABSTRACT

A sowing unit for a sowing machine that comprises a coupling device, a joint device provided between the coupling device and a support device with separate fastening points for functional components, and a sowing heart which meters a work product is disclosed. The support device has a proximal support arm, which couples to the joint device, and a distal support arm, which, on a side of the proximal support arm facing away from the joint device, extends away from the proximal support arm, and on which the sowing heart is arranged laterally in the area of an assembly section in such a way that a rear side of the sowing heart is arranged so as to be located opposite to the assembly section of the distal support arm and a front side of the sowing heart is arranged so as to be unobstructed by the support device.

15 Claims, 3 Drawing Sheets

(56) References Cited

U.S. PATENT DOCUMENTS

2017/0215333 A1\* 8/2017 Johnson ................. A01C 7/201
2017/0295716 A1\* 10/2017 do Amaral Assy ...... A01C 7/04

FOREIGN PATENT DOCUMENTS

| DE | 102008056534 A1 | 5/2010 |
| DE | 102010016342 A1 | 3/2011 |
| EP | 2823700 A1 | 1/2015 |
| WO | 2017027372 A1 | 2/2017 |

\* cited by examiner

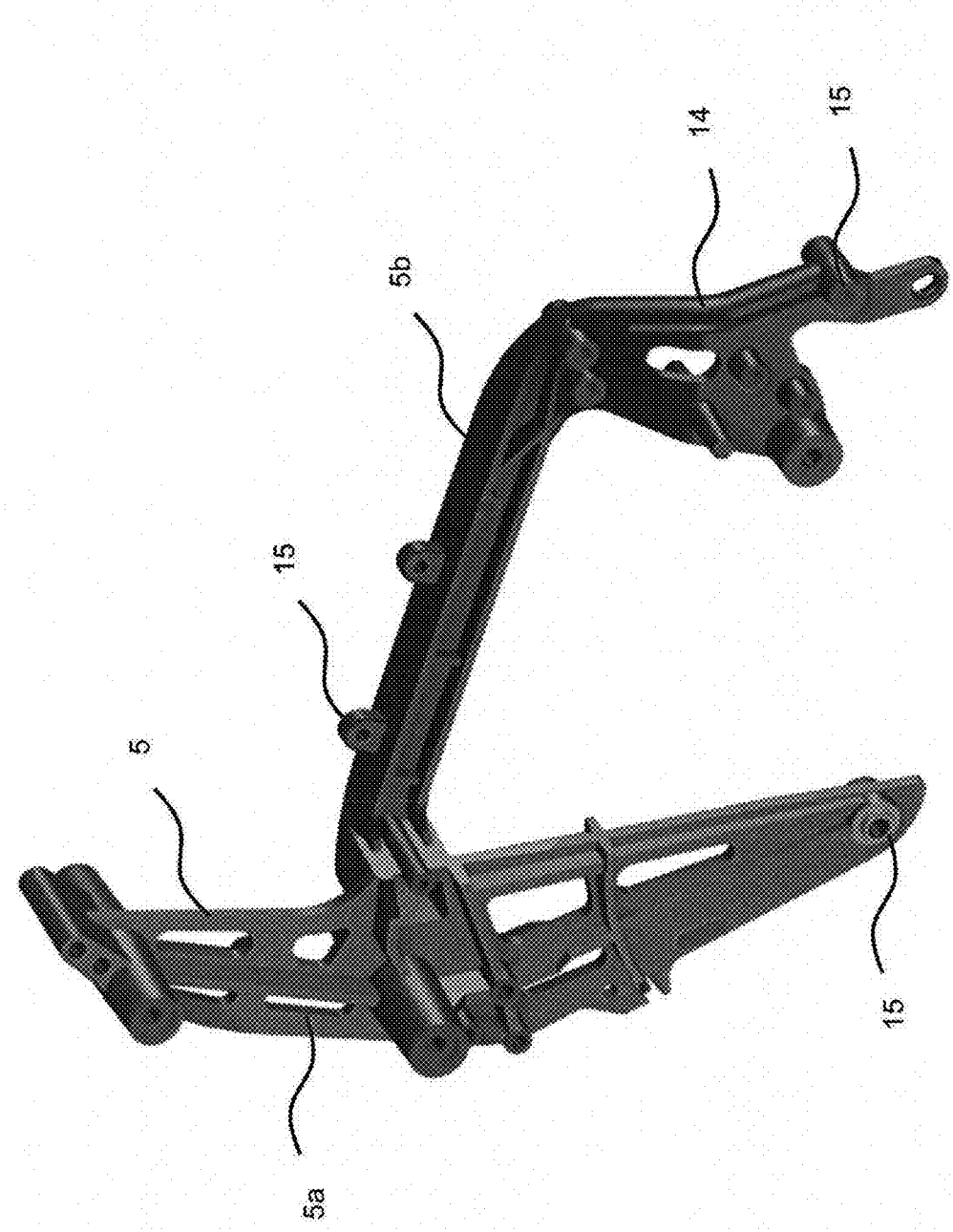

SOWING UNIT FOR A SOWING MACHINE

TECHNICAL FIELD

The present disclosure of the invention relates to a sowing unit for a sowing machine.

BACKGROUND

In sowing machines, a plurality of such sowing units are assembled on a support beam at right angles to the driving, pulling or operating direction, in order to ensure a sequence of sowing units, so that a work product, in particular seeds, can be spread in a plurality of furrows located next to one another in transverse direction. The sowing unit has a plurality of functional components or units, which each take over one or a plurality of partial functions during operation of the sowing machine. A so-called sowing heart, for example, which is a metering device, by means of which the work product, which is to be spread, in particular seeds, is metered, belongs to the functional components. Examples for sowing hearts as well as functional components associated therewith can be found in the following documents DE 196 13 785 C2, DE 10 2008 056 526 B3 as well as DE 10 2008 056 534 A1.

A component part arrangement, which is also identified as seed drill coulter unit, is disclosed in document DE 10 2010 016 342 A1.

In the case of known sowing units, a coupling device, which serves the purpose of assembling the sowing unit on the sowing machine, in particular on a support beam, which runs at right angles to the operating direction, as well as a support device, are connected via a joint, which can be a parallelogram joint. The joint makes it possible to pivot the support device about the support beam during operation. Known support devices vices have a complex design with the goal of supporting the operating function of the different functional components, which are arranged on the support device.

In the document EP 2 823 700 A1, an agricultural implement and a method for operating such is disclosed. The implement comprises a frame having a main section and a wing section pivotally coupled to the main section, a main wheel assembly coupled to the frame main section to support the frame main section for movement over a ground surface, and a wing wheel assembly coupled to the frame wing section to support the frame wing section for movement over a ground surface. A product storage system is mounted to the frame main section to carry a quantity of a product to be applied as the implement is moved over the ground. A weight transfer system is coupled to the frame main and wing sections and adapted to transfer weight from the frame main section to the frame wing section to reduce the load carried by the main wheel assembly. The agricultural implement further comprises a control system adapted to operate the weight transfer system. The control system is adapted to respond to a decrease in a quantity of product in the product storage system during operation of the implement to reduce the weight transferred from the frame main section to the frame wing section during operation of the implement.

The document US 2003/183141 A1 describes a seed drill element. The seed drill element comprises a frame, a seed tank, a seed dispenser, and a member for opening a furrow in the ground. The seed drill element further comprises both means for bearing against the ground, comprising a rear block and/or a front block, with each block being constituted by at least one wheel and an arm hinged to the frame, and also topsoiling means comprising a rear link, two front links, and an intermediate link. The topsoiling means also comprise a mechanism for moving the rear link relative to a reference part connected to the frame. In addition, the seed drill element has for selective locking means so that the topsoiling means can be configured for front topsoiling, for rear topsoiling, and/or for rocker topsoiling.

The document US 2015/351313 A1 discloses a zeroing adjustment for a depth control system of an agricultural seed planting implement. The zeroing adjustment has an adjustable link to compensate for the variable effects of tolerance stack-up and wear, so that all planting units of the implement can be adjusted to a common zero ground penetration setting from which depth settings can be made.

A row unit for use with an agricultural planter is disclosed in the document WO 2017/027372 A1. The row unit includes a furrow creator and an apparatus for controlling the depth of furrow created. The furrow creator is a winged shank. A positive pressure seed meter is included that provides precision planting of one or more particulates. The seed meter can be a single meter or can include more than one meter at each row unit, such as to provide for multi-hybrid or multiparticulate planting. The positive pressure can then be used to delivering the seed via a seed to ground device to plant the one or more particulates in the created furrow. The row unit provides a more precise planting for both seed spacing and depth, as well as other planting characteristics.

SUMMARY

Various embodiments of the invention specify a sowing unit for a sowing machine with an improved design, which in particular supports an efficient assembly and maintenance.

For example, according to one embodiment, a sowing unit for a sowing machine is provided, which has a coupling device and a joint device. The coupling device is configured to couple to a support element of a sowing machine, for example a support beam. A joint, for example in the form of a parallelogram joint, is provided between the coupling device and a support device by means of the joint device. Fastening points for functional components or component parts, which are arranged on the support device, are separately formed on the support device. Provision is made for a sowing heart, which is configured to meter a work product, which is to be spread, for example for spreading individual grains. The support device has a proximal support arm, which couples to the joint device, and a distal support arm. On a side of the proximal support arm, which faces away from the joint device, the distal support arm extends away from said proximal support arm and is integrally molded to the proximal support arm. On the distal support arm, the sowing heart is arranged in the area of an assembly section.

In other embodiments, the proximal support arm and the distal support arm can be arranged together in accordance with a T-shape. In one embodiment, the proximal support arm extends in the vertical direction in at least one initial position, whereas the distal support arm extends substantially horizontally in this case.

The provided construction of the support device and the assembling of the sowing heart on the integrally molded distal support arm support an efficient mounting and, if applicable, disassembly of the sowing unit, in particular with regard to the arrangement of the sowing heart on the support device. A simplified design is provided, which can furthermore facilitate the maintenance and the repair on the sowing heart.

In still other embodiments, the functional components of the sowing heart can be configured for different work products, in particular seeds, fertilizer and/or other granular materials. The sowing heart can be configured for the sowing of individual grains and in particular, e.g., as a single-grain sowing machine.

The support device, which comprises the proximal and the distal support arm, can be designed as an individual mono pivot member, which is articulated by means of the joint device. In one embodiment, a mono pivot arm can be provided, which forms the support device. The mono pivot member is articulated via the joint device.

The sowing heart can be arranged substantially centrally facing in operating direction with respect to the proximal support arm and the joint device. The operating direction can also be identified as pulling or driving direction, along which the sowing machine is moved with the sowing units arranged thereon during operation. When looking at the sowing unit along this direction, the sowing heart is arranged substantially centrally or centered.

The sowing heart can be arranged in a substantially exposed manner at least on one sowing heart side, which extends in the longitudinal direction of the distal support arm. At least on one sowing heart side, thus, looking in the direction at right angles to the operating direction, the sowing heart can be arranged on the support device in an exposed manner, in particular not being obstructed by parts of the support device, optionally also not obstructed by component parts which are assembled on the support device. In one embodiment, provision can be made for the assembly section of the distal support arm to extend along a rear side of the sowing heart, whereas, in contrast, the opposite front side of the sowing heart, again in the viewing direction at right angles to the operating direction, is not obstructed, thus is exposed. In this or other embodiments, the sowing heart can be assembled on the distal support arm in one or a plurality of fastening points, which are assigned exclusively to the sowing heart assembly.

The assembly section can be formed in the area of a lateral protrusion of the distal support arm. In the area of the lateral protrusion, the course of the distal support arm can be straight or curved, for example curved outwards, for example in the shape of an arc. The lateral protrusion can be embodied with the help of a parallel offset of the corresponding section of the distal support arm, in particular in the case of a straight laterally offset section. Sections of the distal support arm adjoining the lateral protrusion on the end side can form a limitation or a stop for the sowing heart, which is assembled in this area.

The assembly section can be formed in the area of a vertically extending flat support arm section of the distal support arm. A support arm section, which extends in a vertical flat manner and is located opposite the side wall section of the sowing heart, can bear thereon in a flat manner. Provision can be made across the vertical flat extension of the support arm section for a plurality of fastening points, which are distributed in a flat manner, for the assembly of the sowing heart.

In the support device, at least the proximal support arm and the distal support arm, which is integrally molded thereon, can be formed on a cast component. The cast component, which can be a cast metal component, can consist of the proximal and the distal support arm. The mono pivot member can for example be embodied as an integral cast component of metal.

In the sowing unit, provision can be made for at least one of the following devices: a furrow cutting device, which is arranged on the support device and which is configured to create a soil furrow for receiving a work product, which is to be spread, during operation; a press-on device, which is arranged on the support device and which is configured to press the work product spread during operation into the soil furrow; a spreading device, which is arranged on the support device and which is configured to receive the metered work product from the sowing heart and to spread it into the soil furrow and/or adjacent thereto during operation; and a tank for the work product, which is to be spread. The sowing heart can be configured to receive the work product from the tank and to then meter it.

At least two or all of the following functional components can be received on fastening points, which are separated from one another, on the support device: the sowing heart, the furrow cutting device, the press-on device, the spreading device, the tank and a receiving device for the tank. In this embodiment, some or all of the functional components are assembled on the support device each via individually assigned fastening points, which are formed separately from one another for the different functional components. For each functional component, provision can be made for one or a plurality of fastening points. The fastening in the fastening points can take place for example by means of a screw connection. In this or other embodiments, the receiving device for the tank can be integrally molded to an upper end of the proximal support arm, either as one-piece or multi-piece receiving device. The receiving device can be formed with a holding device for the tank, at which the tank is held, either detachably or nondetachably. The receiving device can have a holding bracket for the tank. On the upper end section of the proximal support arm, the receiving device for the tank can extend in a direction away from the joint, for example into an area above the furrow cutting device.

Provision can be made for the furrow cutting device to be arranged on the proximal support arm and for the press-on device to be arranged on the distal support arm. In this or other embodiments, the furrow cutting device can be formed with one or a plurality of cutting discs. In the case of a plurality of cutting discs, two cutting discs can be arranged in a V-arrangement. In the different designs, a cover, which is fastened to the proximal support arm, for example, can be arranged upstream of the furrow cutting device in operating or pulling direction. In this or alternative embodiments, the press-on device can be arranged on the distal support arm with the help of a pivot arm. The press-on device serves the purpose of pressing the spread work product, for example the seeds, into the soil, in particular inside the soil furrow and/or adjacent thereto. The press-on device can have one or a plurality of wheels, for example rubber wheels. For at least two of the wheels, provision can be made for a V-arrangement. The press-on device can be capable of being set in such a way that the pressure exerted can be adjusted while pressing on by means of a setting device. In this context, provision can be made for a spring mechanism for providing a spring biasing force.

The sowing heart can be arranged in an installation space, which is provided above the furrow cutting device and below the tank. The installation space can be substantially completely unobstructed at least on one sowing heart side, so that the sowing heart can be detached towards this side, for example in response to a disassembly or for maintenance purposes. Even without detaching the sowing heart, however, this construction allows for an improved accessibility of the sowing heart.

The distal support arm can have a support arm section on the end side, which is angled towards the soil. The support arm section on the end side, which is angled towards the soil, can be integrally molded on the distal support arm, for example in the embodiment as cast component. The press-on device can be arranged on a fastening point on the angled support arm section. The press-on device can be assembled on the angled support arm section by means of a pivot arm. Provision can be made on the pivot arm for one or a plurality of fastening points for press-on rollers or wheels, which can also be arranged so as to be located behind one another in the operating direction. For the different press-on rollers or wheels, provision can in each case be made for a setting device for setting the press-on force.

A sowing depth adjusting or sowing depth setting device, which cooperates with the furrow cutting device, can be provided on the angled support arm section. The adjusting device, which can also be identified as sowing depth adjusting or sowing depth setting device, can be formed with two wheels, for example two rubber wheels, which are arranged on opposite sides of the furrow cutting device. By adjusting the relative position of the wheels to the furrow cutting device, in particular in the height above the soil, the sowing depth can be set. The wheel or the wheels can be supported on a steering component, which, in turn, is fastened on the distal support arm, for example in the area of the angled support arm section. The steering component can have arms, which extend in the operating direction away from the distal support arm on both sides, and on the ends of which the wheels are supported.

A holding device, which supports the tank and which extends into an area above the sowing heart, can be provided on the proximal support arm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 is a perspective illustration of an integrally embodied support device.

DETAILED DISCUSSION

Figure 1:
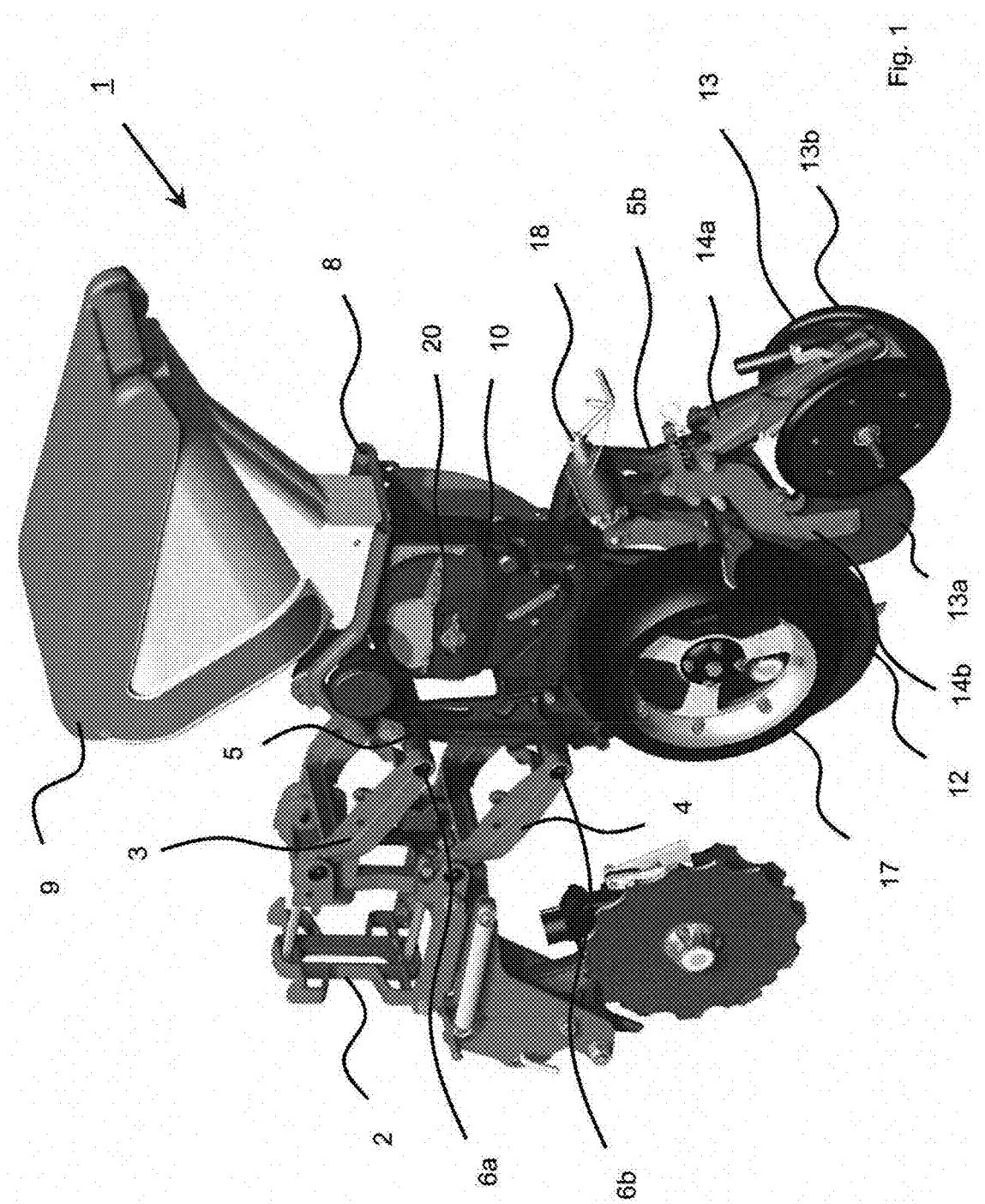
FIG. 1 is a perspective illustration of a sowing unit for a sowing machine.

FIG. 1 shows a perspective illustration of a sowing unit 1 for a sowing machine. The sowing unit 1 has a coupling or fastening device 2, with which the sowing unit 1 can be assembled on or fastened to a component part of a sowing machine (not illustrated), for example a support beam, which extends at right angles to the longitudinal direction of the sowing unit 1. A joint device 3 is formed with a parallelogram joint 4, which is arranged between the coupling device 2 and a support device 5. The support device 5 is coupled to the parallelogram joint 4 in the area of two joint axes 6a, 6b.

Figure 2:
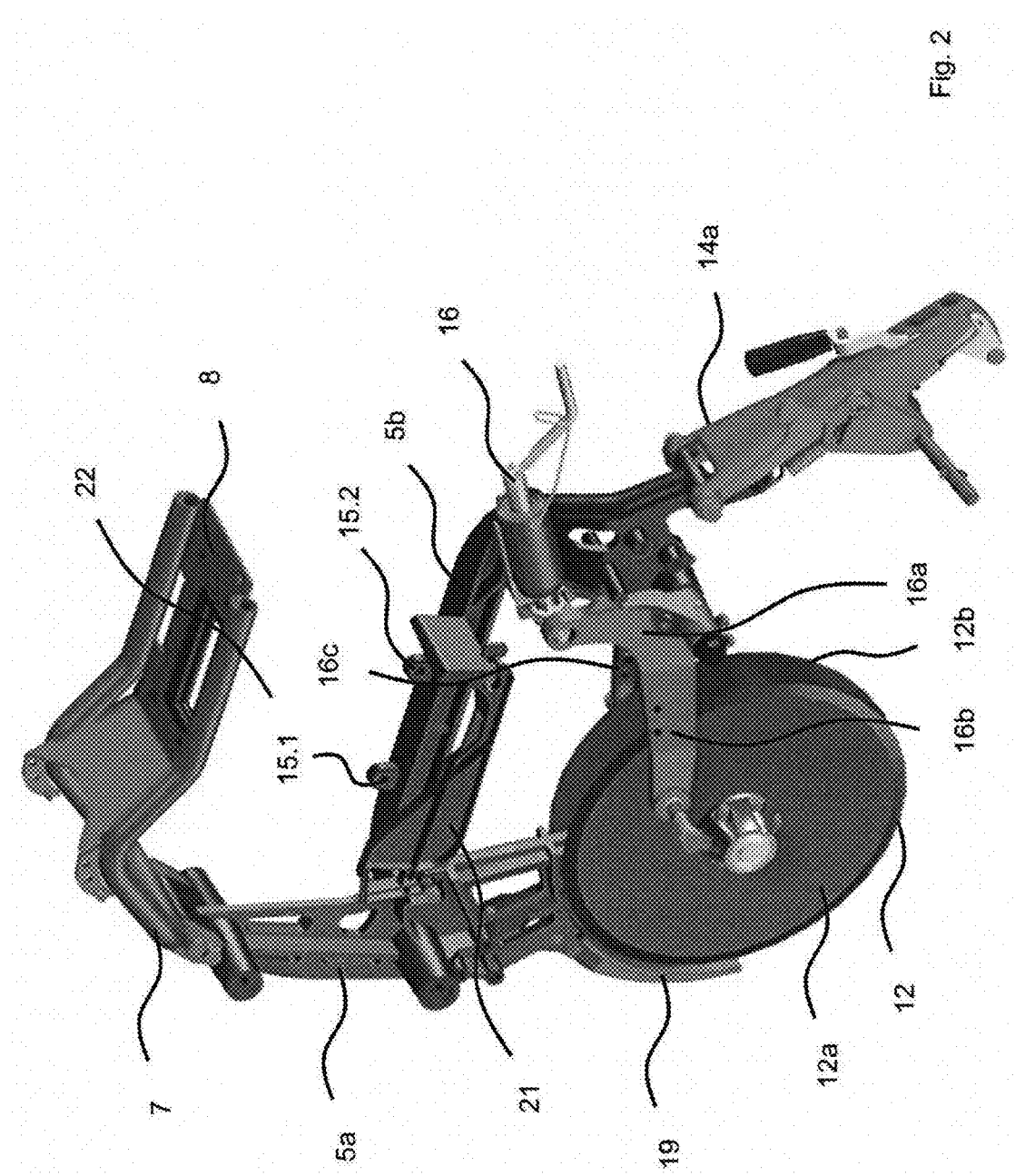
FIG. 2 is a perspective illustration of components of the sowing unit on FIG. 1.

FIGS. 2 and 3 show perspective illustrations of a partial arrangement of the sowing unit 1 as well as the support device 5 in detail.

In the sowing unit 1, a support 7, which extends upwards and rearwards, is arranged on the support device 5 in such a way that a receptacle 8 for a tank 9 is provided, which serves to receive and to provide a work product, in particular seeds, fertilizer and/or microgranules.

The tank 9 is connected to a sowing heart 10, which is arranged below the tank 9 and is assembled on the support device 5 in the embodiment illustrated in FIG. 1. The sowing heart 10 serves to meter the work product, which is to be spread, up to a separation of single grains of seeds. Embodiments for the sowing heart 10 are known as such in different embodiments. From the sowing heart 10, the metered work product reaches a spreading device (not illustrated), which provides a pipe or a duct, for example, through which the seeds reach the soil.

Further functional components are received on the support device 5. These include a furrow cutting device 12 comprising cutting discs 12a, 12b, which are arranged in a V-arrangement, as well as a press-on device 13 comprising press-on wheels 13a, 13b, wherein the press-on wheels 13b are also arranged according to a V-arrangement. In the case of the shown embodiment, the press-on wheels 13a, 13b are arranged on the support device 5 by means of separate pivotable arms 14a, 14b.

The support device 5 has a proximal support arm 5a as well as a distal support arm 5b, which is integrally molded thereon. In the embodiment shown, the support device 5 is embodied as an integral cast component, wherein the proximal support arm 5a extends in the vertical direction in the assembled state of the showing unit 1, whereas the distal support arm 5b extends rearwardly away in the horizontal direction. According to FIGS. 2 and 3, the distal support arm 5b has a support arm section 14 on the end side, which is angled towards the soil and on which the press-on device 13 is arranged in the exemplary embodiment shown.

A plurality of fastening points 15, which are formed separately from one another and which each serve to receive one or a plurality of the functional components and which are only partially provided with a reference numeral in FIG. 3, are arranged on the support device 5 in the area of the proximal and of the distal support arm 5a, 5b. This also applies for a sowing depth adjusting device 16, in which a guide 16a comprising pivot arms 16b, 16c is formed, which extend away from the angled support arm section 14 in the pulling or operating direction and which receive further wheels 17 on the end side. The position of the wheels 17 relative to the furrow cutting device 12 can be set by means of a crank setting device 18 of the sowing or seed depth adjusting device 16, in order to thus set a sowing depth.

A cover 19 is located upstream of the discs of the furrow cutting device 12.

According to the illustration in FIG. 1, the sowing heart 10 is exposed and unobsructed on a sowing heart side, which is visible in the illustration, in particular with regard to component parts or component part sections of the support device 5. This provides for an improved accessibility of the sowing heart 10, either for maintenance purposes and/or for the assembly or disassembly on the support device 5. After loosening screw connections, the sowing heart 10 can be removed from the support device 5 in the horizontal direction at right angles to the operating direction, because the site is substantially clear in this direction. Additionally, the setting of a setting device 20 of the sowing heart 10 from this side of the sowing heart 10 is also facilitated by the exposed, unobstructed arrangement of the sowing heart 10.

According to FIG. 2, an assembly area 21 for the sowing heart 10 comprising fastening points 15.1, 15.2, which are assigned exclusively to the sowing heart 10, is formed on the distal support arm 5*b*. The sowing heart 10 can be assembled in an assembly or installation space 22 above the furrow cutting device 12 and below the tank 9 in this way.

The features disclosed in the above description, in the claims as well as in the drawing, can be significant for the realization of the different embodiments, both alone and in any combination, and that having provided reference to specific embodiments, it will be apparent that modifications and variations are possible without departing from the scope of the present disclosure defined in the appended claims.

What is claimed is:

1. A sowing unit for a sowing machine, comprising:
    a coupling device configured to couple to a support element of a sowing machine;
    a joint device having a joint provided between the coupling device and a support device, the support device having formed and arranged thereon separate fastening points for functional components;
    a sowing heart configured to meter a work product that is to be spread;
    a proximal support arm of the support device; and
    a distal support arm of the support device, the distal support arm being formed in one piece, wherein:
        the proximal support arm couples to the joint device and the distal support arm, which on a side of the proximal support arm facing away from the joint device, extends away from said proximal support arm and is integrally molded to the proximal support arm, and
        the sowing heart has a pair of vertical sides that extend parallel to an operating direction and the sowing heart is arranged at a lateral side of the distal support arm in the area of an assembly section in such a way that, when viewing in a direction transversely to the operating direction of the sowing unit, the pair of sides of the sowing heart and the distal support arm overlap, wherein one of the pair of sides of the sowing heart is unobstructed by the support device and another one of the pair of sides of the sowing heart is located opposite to the assembly section of the distal support arm.

2. The sowing unit according to claim 1, wherein the sowing heart is arranged substantially centrally facing in the operating direction with respect to the proximal support arm and the joint device.

3. The sowing unit according to claim 1, wherein the assembly section is formed in the area of a lateral protrusion of the distal support arm.

4. The sowing unit according to claim 2, wherein the assembly section is formed in the area of a lateral protrusion of the distal support arm.

5. The sowing unit according to claim 1, wherein the assembly section is formed in the area of a vertically extending flat support arm section of the distal support arm.

6. The sowing unit according to claim 1, wherein at least the proximal support arm and the distal support arm are formed on a cast component.

7. The sowing unit according to claim 1, wherein at least one additional device is selected from the following group:
    a furrow cutting device, which is arranged on the support device and which is configured to create a soil furrow for receiving the work product during operation;
    a press-on device, which is arranged on the support device and which is configured to press the work product spread during operation into the soil furrow;
    a spreading device, which is arranged on the support device and which is configured to receive the metered work product from the sowing heart and to spread it into the soil furrow and/or adjacent thereto during operation; and
    a tank for the work product.

8. The sowing unit according to claim 7, wherein the furrow cutting device and the press-on device are selected and received on the fastening points separated from one another.

9. The sowing unit according to claim 7, wherein the furrow cutting device is selected and arranged on the proximal support arm and the press-on device is also selected and arranged on the distal support arm.

10. The sowing unit according to claim 8, wherein the furrow cutting device is arranged on the proximal support arm and the press-on device is arranged on the distal support arm.

11. The sowing unit according to claim 7, wherein the furrow cutting device and the tank are selected, and the sowing heart is provided in an installation space, which is provided above the furrow cutting device and below the tank.

12. The sowing unit according to claim 1, wherein the distal support arm has a support arm section on an end side, which is angled towards the soil.

13. The sowing unit according to claim 12, further comprising a press-on device which is configured to press the work product spread during operation into the soil furrow, wherein the press-on device is arranged on a fastening point on the angled support arm section.

14. The sowing unit according to claim 12, further comprising a furrow cutting device, which is arranged on the support device and which is configured to create a soil furrow for receiving the work product during operation, and wherein a sowing depth adjusting device, which cooperates with the furrow cutting device, is provided on the angled support arm section.

15. The sowing unit according to claim 1, further comprising a tank for the work product, and a holding device, which supports the tank and which extends into an area above the sowing heart, being provided on the proximal support arm.

\* \* \* \* \*